United States Patent [19]

Yoshida

[11] Patent Number: 4,549,142
[45] Date of Patent: Oct. 22, 1985

[54] PHASE DEMODULATOR INCLUDING VARIABLE PHASE SHIFTER FOR CONTROLLING REFERENCE CARRIER

[75] Inventor: Yasuharu Yoshida, Tokyo, Japan

[73] Assignee: Nec Corporation, Tokyo, Japan

[21] Appl. No.: 544,199

[22] Filed: Oct. 21, 1983

[30] Foreign Application Priority Data

Oct. 30, 1982 [JP] Japan .................................. 57-190029

[51] Int. Cl.[4] .............................................. H03D 3/00
[52] U.S. Cl. .................................... 329/50; 329/124; 331/12; 331/23
[58] Field of Search ......................... 329/50, 122, 124; 331/10, 11, 12, 23; 455/260, 265; 375/81, 120

[56] References Cited

U.S. PATENT DOCUMENTS 4,057,762 11/1977 Namiki ................................... 329/50
4,470,147 9/1984 Goatcher .......................... 329/50 X Primary Examiner—Siegfried H. Grimm
Attorney, Agent, or Firm—Sughrue, Mion, Zinn, Macpeak, and Seas

[57] ABSTRACT

The outputs of respective phase detectors in an orthogonal phase detector circuit are subjected to A/D conversion, and selected bits from each A/D converter are logically combined not only to recover the reference carrier but also to detect any non-orthogonality of the carriers provided to the phase detectors. The phase shifter for providing the orthogonal reference carrier to the second phase detector is a variable phase shifter controlled in accordance with a control signal, with the control signal being adjusted in accordance with the detected non-orthogonality condition.

2 Claims, 9 Drawing Figures

PHASE DEMODULATOR INCLUDING VARIABLE PHASE SHIFTER FOR CONTROLLING REFERENCE CARRIER

BACKGROUND OF THE INVENTION

The present invention relates to a phase demodulator for demodulating digital-signal-modulated carrier waves by phase detection.

Digital-signal-modulated carrier waves such as those provided by the phase shift keying (PSK), quadrature amplitude modulation (QAM), or the like are generally demodulated by orthogonal phase detectors. The orthogonal phase detectors are individually supplied with reference carrier waves which are orthogonal to each other, that is, one is supplied directly with a reference carrier itself and the other with the reference carrier through a 90-degrees phase shifter. When such phase detectors are supplied with modulated carrier waves of the same phase, they multiply the modulated carrier waves by the reference waves coupled thereto and thereby produce at their output terminals demodulated signals which are orthogonal to each other.

In a phase demodulator of the type described, deterioration in bit error rate has to be eliminated in order that the reference carrier waves fed to the two phase detectors may be held orthogonal to each other, as will be described later in detail. A 90-degree phase shifter in practical use cannot meet such a demand because the phase is susceptive to variations in ambient temperature, power source voltage, and to a long-term variation in circuit constant.

SUMMARY OF THE INVENTION

It is an object of the present invention to provide a phase demodulator which is capable of insuring orthogonality at all times and thereby eliminates deterioration in bit error rate due to changes in the circuit constant of a phase shifter.

In accordance with the present invention there is provided a phase demodulator comprising a first phase detector means for phase-detecting an input digital-signal-modulated carrier wave with a reference carrier wave fed thereto, a variable phase shifter means for controlling the phase of the reference carrier wave in response to a control signal, a second phase detector means for phase-detecting the input digital-signal-modulated carrier wave in response to an output of the variable phase shifter supplied thereto, means for recovering the reference carrier wave, multi-level discriminator means for multi-level-discriminating the outputs of the first and second phase detectors, and logic means for logically processing the output of the discriminator means and providing an orthogonality error signal as the control signal.

BRIEF DESCRIPTION OF THE DRAWINGS

The present invention will be described in detail with reference to the accompanying drawings, in which.

DETAILED DESCRIPTION OF THE INVENTION

Figure 1:
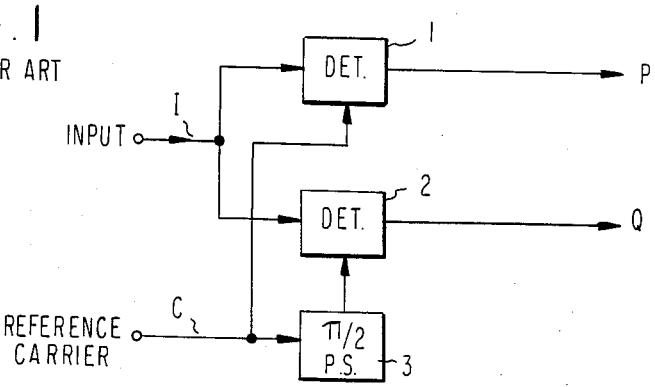
FIG. 1 is a block diagram of a prior art orthogonal phase detector circuit.
Figure 2:
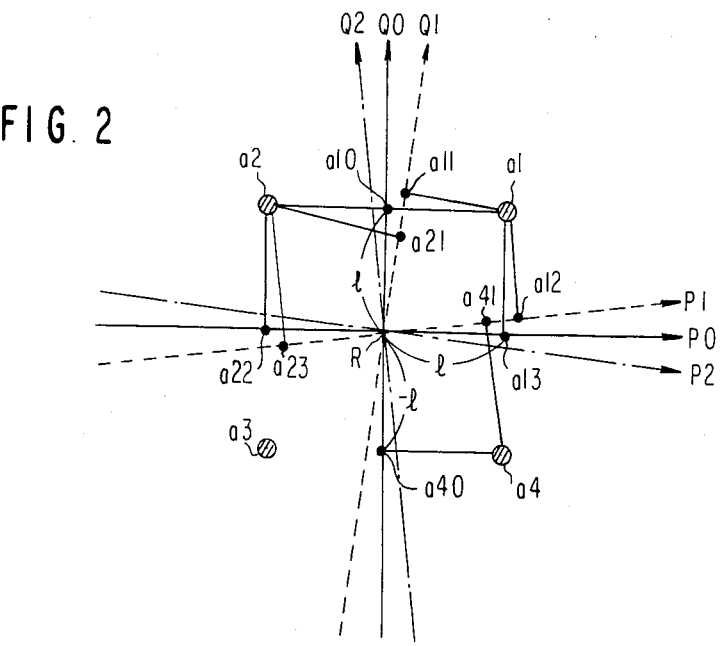
FIG. 2 is a diagram demonstrating the operation of the phase detector circuit shown in FIG. 1.

Referring to FIG. 1, an example of a prior art orthogonal phase detector circuit is shown in a block diagram. The circuit comprises phase detectors 1 and 2, and a 90-degree phase shifter 3. Each of the phase detectors 1 and 2 is supplied at an input terminal thereof with an input signal I which is assumed to be a four-phase PSK carrier wave by way of example. At the other input terminal, the detector 1 receives a reference carrier wave C and the detector 2, a 90-degree shifted version of the reference carrier wave C via the phase shifter 3. Stated another way, supplied to the two detectors 1 and 2 are reference carrier waves which have a phase difference of 90 degrees relative to each other. Therefore, when supplied with input signals of the same phase, the detectors 1 and 2 individually multiply them by the reference carriers and provide demodulated signals P and Q at their output terminals. Referring also to FIG. 2 which is a signal vector diagram, the input 4-phase carrier PSK wave is represented by signal points $a_1$-$a_4$ while the demodulated signals P and Q are represented by those values obtainable by projecting the signal points $a_1$-$a_4$ respectively to the abscissa $P_0$ and ordinate $Q_0$, i.e. values $+l(\overline{Ra}_{13}, \overline{Ra}_{10})$ and $-l(\overline{Ra}_{22}, \overline{Ra}_{40})$. The abscissa $P_0$ and ordinate $Q_0$ respectively indicate the phases of the reference carriers fed to the phase detectors 1 and 2 and are in exactly orthogonal relation to each other.

In the prior art circuit described above, a problem arises when the reference carrier waves fed to the phase detectors 1 and 2 are shifted in phase by an angle other than 90 degrees. Assuming a phase shift angle smaller than 90 degrees for example, the abscissa $P_0$ will shift to a position $P_1$ and the ordinate $Q_0$ to a position $Q_1$, thereby changing the signals P and Q by $\pm(\overline{Ra}_{12}-\overline{Ra}_{41})$ and $\pm(\overline{Ra}_{11}-\overline{Ra}_{21})$, respectively. Because $\overline{Ra}_{12}=\overline{Ra}_{11}$ and $\overline{Ra}_{41}=\overline{Ra}_{21}$, the deviation of the phase shift angle from 90 degrees deteriorates the input C/N value to bit error rate characteristic approximately by $$20 \log \frac{\overline{Ra}_{41}}{\overline{Ra}_{13}} = 20 \log \frac{\overline{Ra}_{21}}{\overline{Ra}_{10}} \text{ (dB)}.$$

It will therefore be seen that exact orthoginality between the reference carrier waves fed to the phase detectors 1 and 2 is a primary requisite in preventing the bit error rate from being impaired due to a phase shift angle other than 90 degrees. A 90-degree phase shifter in practical use, however, comprises the combination of a coil, capacitor, amplifier and the like, for example, which are susceptive to variations in ambient temperature, power source voltage and to a long-term variation in circuit constant, failing to maintain the phase shift angle accurately at the desired 90 degrees.

A phase demodulator embodying the present invention will be described, which is successful in overcoming the drawback discussed above.

Figure 3:
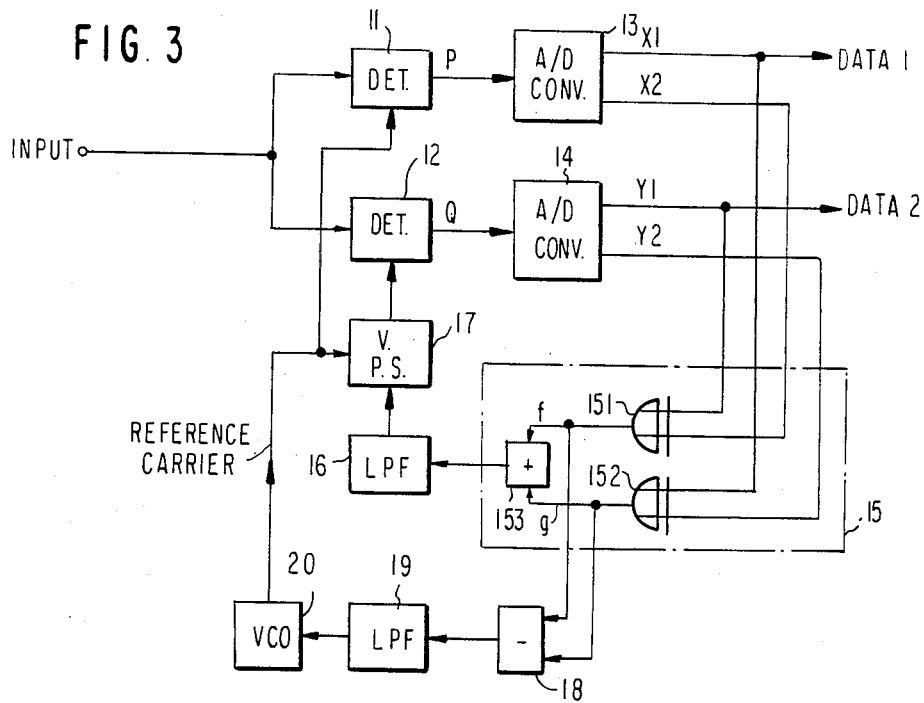
FIG. 3 is a block diagram showing a first embodiment of a phase demodulator according to the present invention.
Figure 4:
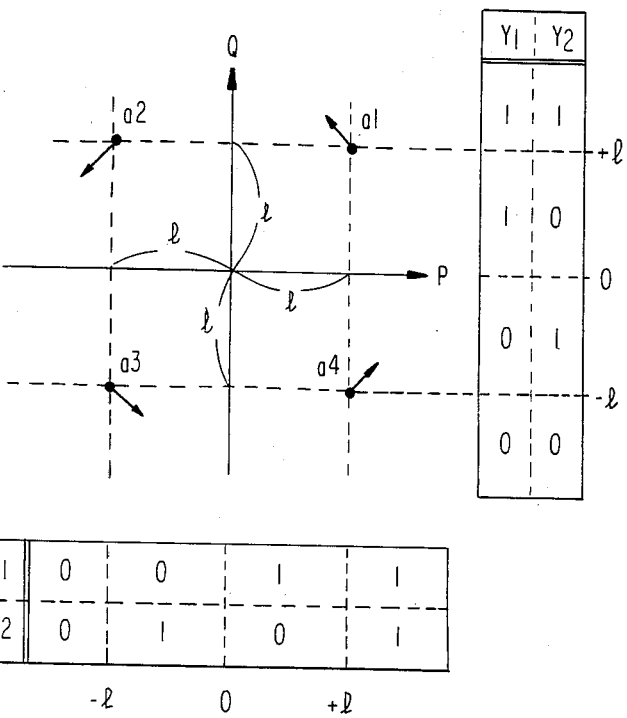
FIG. 4 is a diagram representing the operation of the demodulator shown in FIG. 3.

Referring to FIG. 3, a first embodiment of the present invention applied to a 4-phase PSK carrier wave demodulator is shown in a block diagram. The demodulator includes phase detectors 11 and 12 which connect to 2-bit analog-to-digital (A/D) converters 13 and 14, respectively. The demodulator also includes a logic circuit 15, low-pass filters (LPF's) 16 and 19, a variable phase shifter 17, Exclusive-OR gates (EX-OR's) 151 and 152, an adder 153, a subtractor 18, and a voltage-controlled oscillator (VCO) 20. The output P of the phase detector 11 is fed to the A/D converter 13 to be discriminated thereby with respect to threshold levels 0, +1 and −1. Likewise, the output of the other phase detector 12 is discriminated by the A/D converter 14 with respect to the same three threshold levels as assigned to the A/D converter 13. The A/D converter 13 produces outputs $X_1$ and $X_2$ and the A/D converter 14, outputs $Y_1$ and $Y_2$, each having four different levels. The graph shown in FIG. 4 represents the relationship between the 4-phase PSK input signals and the 4-level signals $X_1$, $X_2$ and $Y_1$, $Y_2$ which correspond to the input signal levels discriminated with respect to the threshold levels 0, +1 and −1.

On a deviation in orthogonality, the signals, $X_1$, $X_2$, $Y_1$ and $Y_2$ will have a relationship with the modulated signal points $a_1$–$a_4$ as shown in Table 1 or 2. It should be noted that Table 1 corresponds to a phase difference smaller than 90 degrees, that is, detection with such reference carrier waves as $Q_1$ and $P_1$ shown in FIG. 2, while Table 2 corresponds to a phase difference greater than 90 degrees, that is, detection with the reference carrier waves $Q_2$ and $P_2$.

TABLE 1

| SIGNAL POINT | $X_1$ | $Y_1$ | $X_2$ | $Y_2$ | f | g |
|---|---|---|---|---|---|---|
| 1. $a_1$ | 1 | 1 | 1 | 1 | 0 | 0 |
| 2. $a_2$ | 0 | 1 | 1 | 0 | 0 | 0 |
| 3. $a_3$ | 0 | 0 | 0 | 0 | 0 | 0 |
| 4. $a_4$ | 1 | 0 | 0 | 1 | 0 | 0 |

TABLE 2

| SIGNAL POINT | $X_1$ | $Y_1$ | $X_2$ | $Y_2$ | f | g |
|---|---|---|---|---|---|---|
| 1. $a_1$ | 1 | 1 | 0 | 0 | 1 | 1 |
| 2. $a_2$ | 0 | 1 | 0 | 1 | 1 | 1 |
| 3. $a_3$ | 0 | 0 | 1 | 1 | 1 | 1 |
| 4. $a_4$ | 1 | 0 | 1 | 0 | 1 | 1 |

Thus, the logic circuit 15 processes the outputs $X_1$, $X_2$, $Y_1$ and $Y_2$ of the A/D converters 13 and 14 so that the Ex-ORs 151 and 152 respectively provide the signals f and g shown in Tables 1 and 2; the signals f and g commonly have a logical "0" level whenever the phase difference is smaller than 90 degrees, and a logical "1" level whenever it is larger than 90 degrees. The f and g signals are added together by the adder 153 the output of which is fed to the LPF 16. The LPF 16 suppresses a jitter component in the adder output while extracting a DC control signal therefrom. The DC control signal is supplied through a buffer amplifier, if necessary, to the variable phase shifter 17 which comprises a combination of a coil and a capacitor and a phase control element, which may be a varactor for example. The control signal provided from the LPF 16 is fed to the varactor so that the output of the variable phase shifter 17 may be shifted in phase by 90 degrees relative to the input reference carrier wave, thereby insuring the orthogonality of the reference carrier waves supplied to the two phase detectors 11 and 12. As a result, the outputs $X_1$ and $Y_1$ respectively appear at the output terminals of the A/D converters 13 and 14 as digital signals DATA-1 and DATA-2 which were demodulated with exact orthogonality.

Figure 7:
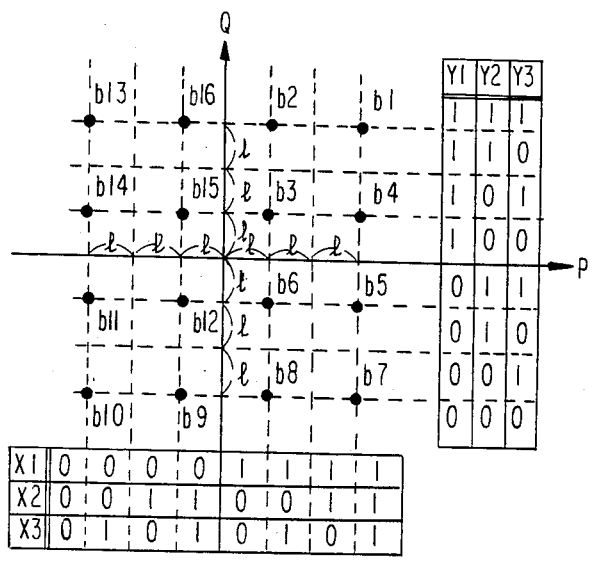
FIGS. 7 and 8 are diagrams demonstrating the operation of the embodiment shown in FIG. 6.

In the circuitry shown in FIG. 3, each of the 2-bit A/D converters may comprise a discriminator circuit which includes a full-wave rectifier, as shown in FIG. 7 in U.S. Pat. No. 4,099,180 issued July 4, 1978. A prerequisite in this instance is, of course, that the logic circuit be so constructed as to provide the logical outputs f and g as shown in Tables 1 and 2.

The reference carriers supplied to the phase detectors 11 and 12 are demodulated in the following manner. Concerning the signal f, it is a digital signal whose logical level is "1" when the signal points $a_1$–$a_4$ are rotated in phase as indicated by arrows in FIG. 4, and "0" when the phase rotation occurs in the opposite direction. Likewise, the signal g is a digital signal whose logical level becomes "0" in response to the phase rotation indicated by the arrows and "1" in response to the opposite phase rotation. Therefore, subtracting the signal g from the signal f by the subtractor 18 will cause a logical "1" digital signal to appear at the output of the subtractor 18 if the phase rotation of the signal points $a_1$–$a_4$ is as indicated by arrows, and a logical "0" digital signal if the phase rotation occurs in the other direction. These digital signals serve as error signals for detecting a phase deviation of the signal points $a_1$–$a_4$. The reference carrier, therefore, will appear at the output of the VCO 20 when the output of the subtractor 18, or control signal, is applied to the VCO 20 via the LPF 19 which suppresses any jitter component in the control signal. It will be apparent to those skilled in this art that either one of the signals f and g may serve as the error signal without the other.

Figure 5:
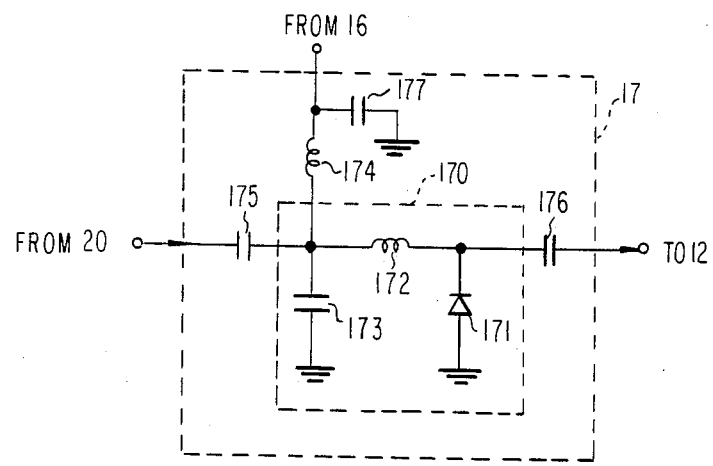
FIG. 5 is a circuit diagram showing an example of a variable phase shifter included in the construction shown in FIG. 3.

Referring to FIG. 5, a practical example of the variable phase shifter 17 is illustrated. As shown, the phase shifter 17 comprises an LPF 170, a choke 174, coupling capacitors 175 and 176, and a bypass capacitor 177. The LPF 170 comprises a varactor diode 171, an inductor 172, and a capacitor 173. The control voltage output from the LPF 16 (FIG. 3) is supplied to the varactor diode 171 via the choke 174 and inductor 172. The capacitance of the diode 171 will vary in response to the change in the incoming control voltage, thereby changing the cut-off frequency of the LPF 170. The change in the cut-off frequency is accompanied by a change in the phase of the signal which is passed through the LPF 170. In short, the output phase of the VCO 20 (FIG. 3) can be controlled by the output voltage of the LPF 16.

Figure 6:
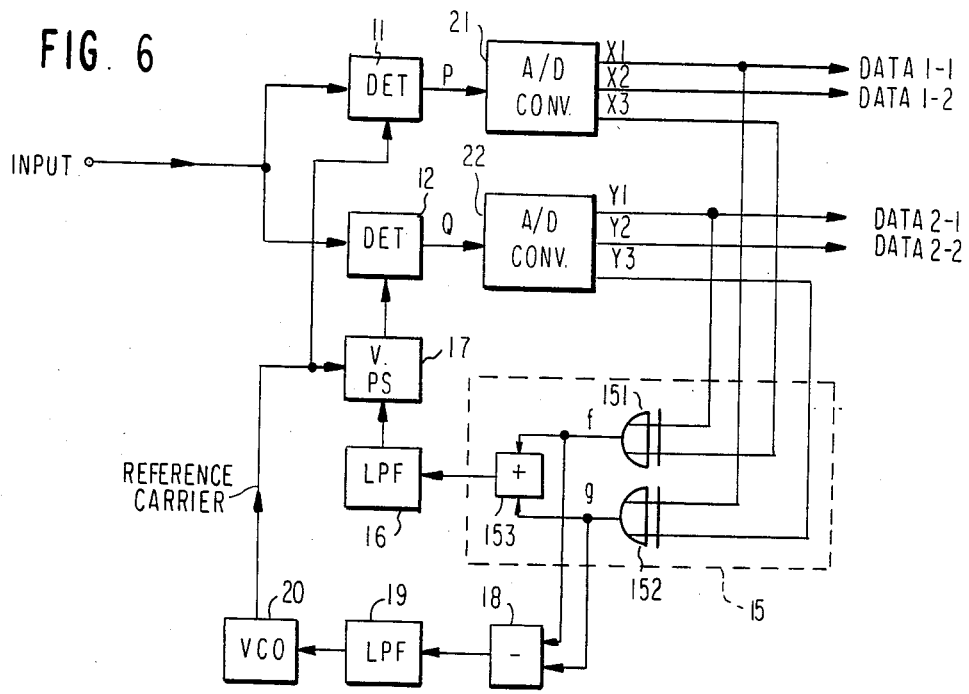
FIG. 6 is a block diagram showing a second embodiment of the present invention.
Figure 8:
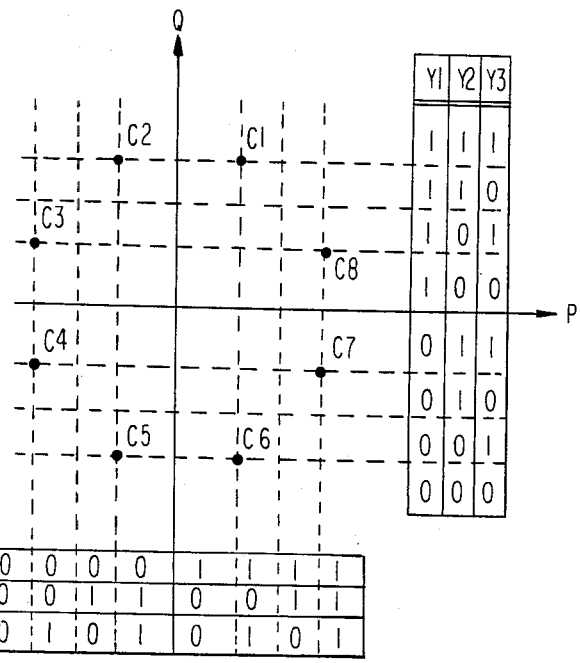

Referring to FIG. 6, a second embodiment of the present invention is shown which is applied to a 16-level QAM wave. The phase demodulator is distinguished from the construction shown in FIG. 4 by provision of 3-bit A/D converters 21 and 22. As shown in FIG. 7, signals indicative of dislocations of 16-level QAM signals appear at outputs $X_3$ and $Y_3$ as represented by $b_1$–$b_{16}$. Therefore, the demodulator shown in FIG. 6 is applicable to 16-level QAM signals if the outputs $X_2$ and $Y_2$ shown in FIG. 3 are replaced by outputs $X_3$ and $Y_3$ of FIG. 6. Additionally, the circuit of FIG. 6 is applicable to 8-level PSK waves in which case the outputs 21 and 22 should deliver data signals $X_1$–$X_3$ and $Y_1$–$Y_3$ as shown in FIG. 8. It will be noted in FIG. 8 that $C_1$–$C_8$ individually represent eight signal points of 8-level PSK waves.

Figure 9:
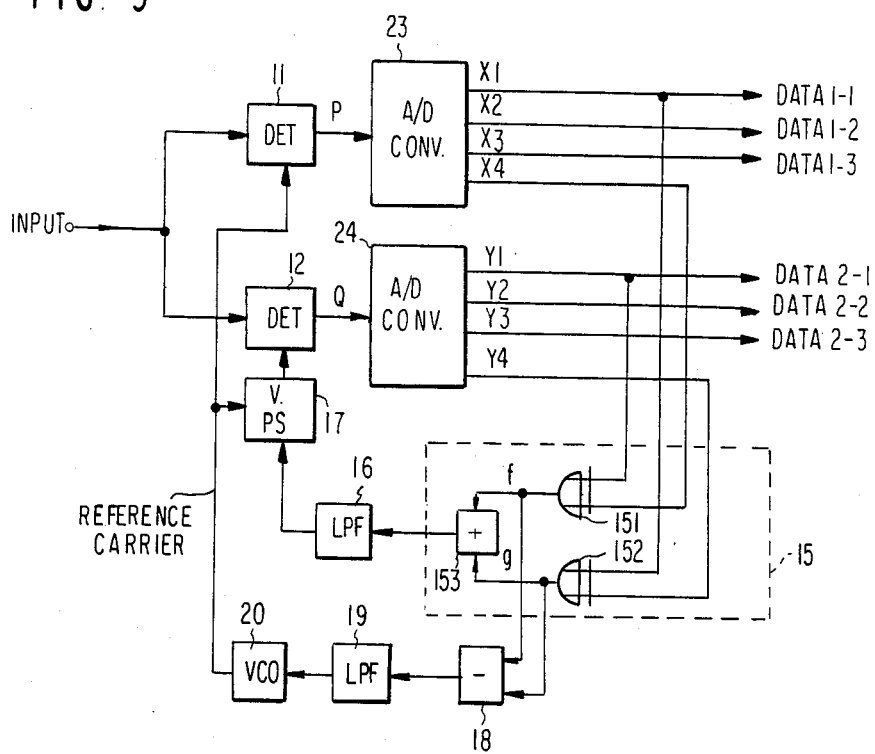
FIG. 9 is a block diagram of a third embodiment of the present invention.

Referring to FIG. 9, a third embodiment of the present invention is shown which is applicable to 64-level QAM waves. This embodiment is essentially similar to the construction shown in FIG. 3 except for the replacement of the inputs $X_2$ and $Y_2$ to the logic circuit 15 by inputs $X_4$ and $Y_4$.

While a demodulator for 8-level PSK waves has been described as representative of modulators for multiphase PSK waves, and a 64-level demodulator, at the maximum, as that of QAM waves, it will be apparent to those skilled in the art that the present invention can be employed with any other multiphase PSK or QAM wave demodulator if the A/D converters shown in FIG. 6 are replaced accordingly.

Although the present invention has been shown and described with importance placed on the orthogonality between two phase detectors, a more significant feature of the present invention is that the receiving station is capable of compensating for any deviation in orthogonality which may occur at the transmitting station during modulation or in the transmission path.

In summary, it will be seen that the present invention provides a phase demodulator which includes multilevel discriminators individually connected to outputs of phase detectors, and a logic circuit for processing outputs of the discriminators, so that a phase shifter for an orthogonal reference carrier to be fed to the phase detectors is controlled to a proper phase by the output of the logic circuit. This not only allows deviation in orthogonality due to the change in the constant of the phase shifter, but also enables deviation or distortion in the orthogonality of received signals to be compensated for. The phase demodulator, therefore, prevents demodulated digital signals from suffering from deterioration in their bit error rate and thereby insures reliable signal quality.

What is claimed is:

1. A phase demodulator comprising:
   a first detector means for phase-detecting an input digital-signal-modulated carrier wave with a reference carrier wave supplied thereto;
   a variable phase shifter means for receiving said reference carrier wave and controlling its phase in response to a control signal;
   a second phase detector means for phase-detecting said input modulated carrier waves with the output of said variable phase shifter;
   means for recovering said reference carrier wave;
   multilevel discriminator means for multilevel discriminating outputs of said first and second detectors, said multilevel discriminator means comprising analog-to-digital (A/D) conversion means for receiving outputs of said first and second phase detector means and for providing corresponding first and second multi-bit digital signals, at least a portion of each multi-bit digital signal generated from each phase detector output representing demodulated data; and
   logic means for logically processing the output of the discriminator means and providing an orthogonality error signal as said control signal, said logic means comprising a first Exclusive OR (EOR) gate for receiving and combining selected bits from each of said multi-bit A/D converter output signals, a second EOR gate for receiving and combining different selected bits from each of said multi-bit A/D converter output signals, an adder means for adding the outputs of said first and second EOR gates to obtain said control signal.

2. A phase demodulator comprising:
   a first phase detector means for phase-detecting an input signal with a reference carrier wave supplied thereto, said input signal comprising a carrier wave modulated with a digital information signal;
   a variable phase shifter means for receiving said reference carrier wave and controlling its phase in response to a control signal;
   a second phase detector means for phase-detecting said input signals with the output of said variable phase shifter means;
   means for recovering said reference carrier wave;
   means for detecting non-orthogonality of the reference carrier wave supplied to said first phase detector means and the phase shifter output supplied to said secnd phase detector means, said means for detecting non-orthogonality comprising: first A/D conversion means for generating a first plurality of bits representing digital data contained in the output of said first phase detector means, and generating a further output bit; second A/D conversion means for generating a second plurality of output bits representing digital data contained in the output of said second phase detector means, and generating a further output bit; first logic means for logically combining said further output bit from said first A/D conversion means with at least one of said second plurality of output bits; second logic means for logically combining said further output bit from said second A/D conversion means with at least one of said first plurality of output bits; and means for combining outputs of said first and second logic means to obtain said control signal; and
   means responsive to said non-orthogonality detection for adjusting the value of said control signal.

* * * * *